United States Patent [19]

Nelson

[11] Patent Number: 4,988,406
[45] Date of Patent: Jan. 29, 1991

[54] INSULATION DEVICE AND METHOD OF MAKING SAME

[75] Inventor: Thomas E. Nelson, Anchorage, Ky.

[73] Assignee: Soltech, Inc., Shelbyville, Ky.

[21] Appl. No.: 302,101

[22] Filed: Jan. 24, 1989

Related U.S. Application Data

[63] Continuation-in-part of Ser. No. 931,150, Nov. 17, 1986, abandoned.

[51] Int. Cl.$^5$ .............................................. B32B 31/16
[52] U.S. Cl. .................................... 156/73.6; 52/809; 53/431; 53/452; 53/469; 53/474; 156/146; 156/196; 156/227; 156/276; 156/292; 428/76
[58] Field of Search ........................................ 156/196

[56] References Cited

U.S. PATENT DOCUMENTS

| | | | |
|---|---|---|---|
| 1,456,083 | 5/1923 | Weiss | 156/276 |
| 1,923,195 | 8/1933 | Finck | 52/809 |
| 1,997,324 | 4/1935 | Thayer | 428/76 |
| 2,700,633 | 1/1955 | Bovenkerk | 156/292 |
| 2,745,779 | 5/1956 | Ritter et al. | 156/276 |
| 2,927,626 | 3/1960 | Corwin et al. | 156/281 |
| 3,926,306 | 12/1975 | Van Nederveen | 156/73.6 |
| 4,318,427 | 3/1982 | Cross | 428/76 |
| 4,350,001 | 9/1982 | Shishoo | 53/431 |

Primary Examiner—John J. Gallagher
Attorney, Agent, or Firm—Woodard, Emhardt, Naughton, Moriarty & McNett

[57] ABSTRACT

A insulation device includes an enclosure defining a cavity which is filled with a binderless, loose, discrete, divided insulation material. An uncured binder is homogeneously dispersed through the insulation filling material prior to installing the insulation material in the enclosure. The binder is cured after the insulation material is installed in the cavity to prevent the shifting or settling of the insulation material within the cavity. The insulation device can be made by forming an opening into the cavity of the enclosure, injecting binderless, loose, discrete, divided insulation material into the enclosure cavity and concurrently applying an uncured binder on the insulation material as it is being injected into the enclosure cavity to homogeneously distribute the uncured binder throughout the insulation material being injected into the enclosure cavity, and closing the opening of the enclosure. Alternatively, the uncured binder is mixed with the insulation material before the insulation material is injected into the enclosure cavity.

17 Claims, 4 Drawing Sheets

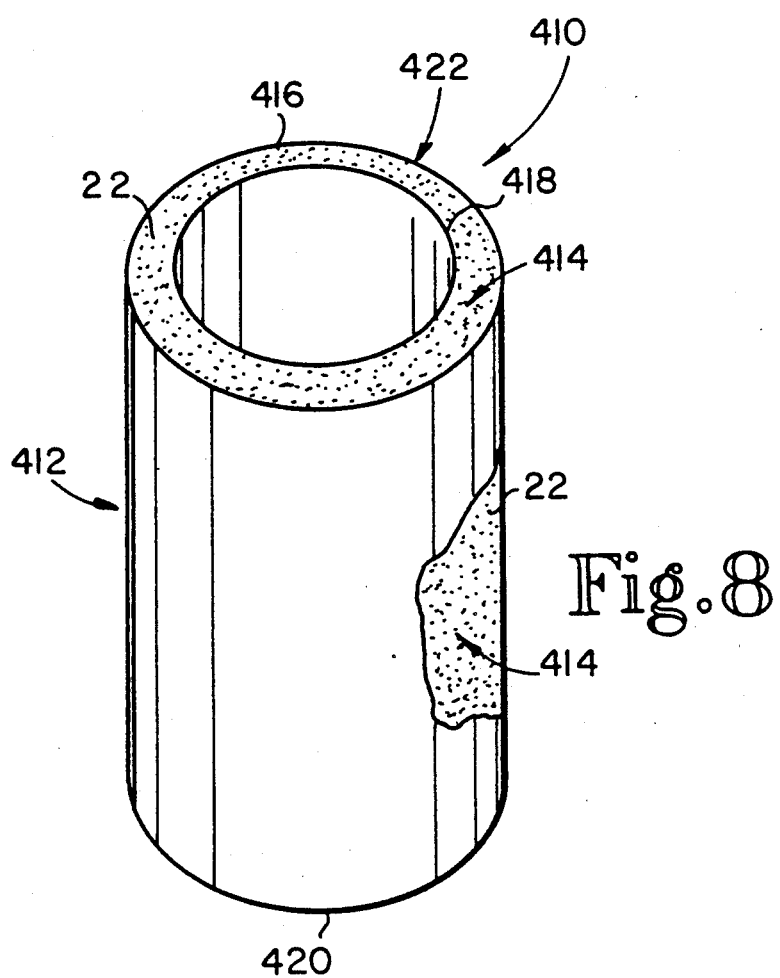

INSULATION DEVICE AND METHOD OF MAKING SAME

REFERENCE TO RELATED APPLICATIONS

This patent application is a continuation-in-part patent application of prior patent application Ser. No. 931,150, filed Nov. 17, 1980, now abandoned.

BACKGROUND OF THE INVENTION

1. Field of the Invention

The invention relates to insulation devices, either thermal or acoustical, which can be used as, for example, a jacket or cover over a structure, or as an insert module into a hollow wall structure, and the like.

2. Description of the Prior Art

Various insulation devices are known. Examples of such devices are shown in U.S. Pat. No. 1,9949,677 isused on March 6, 1934 to W. F. Crawford; U.S. Pat. No. 2,365,086 issuesd on Dec. 12, 1944 to J. T. Karnowski; U.S. Pat. No. 2,817,124 issued on Dec. 24, 1957 to E. S. Dybvig; U.S. Pat. No. 4,269,890 issued on May 26, 1981 to R. Breitling et al; U.S. Pat. No. 4,282,279 issued on Aug. 4, 1981; and U.S. Pat. No. 4,403,023 issued on Sept. 6, 1983 to H. Reiss.

U.S. Pat. No. 1,949,677 shows an insulating jacket to fit about a container which has flexible walls of canvas with a layer of intertwined horsehair or felt between the canvas walls. The canvas walls are stitched together in a waffle pattern through the horsehair or felt insulation to hold the insulation in place.

U.S. Pat. No. 2,365,086 shows an insulating jacket having inner and outer sheets of convas forming the walls of the jacket with rock wool insulation material therebetween. The inner and outer sheets of canvas are sewn together at intervals to form pockets in which the insulation is placed to hold the insulation in place.

U.S. Pat. No. 2,817,124 shows a two-compartment bag with an intermediate wall separating the compartments. One compartment is filled with a porous solid insulation material such as rock wool or fiberglass and a gas of low heat conductivity. The other compartment is filled with a compressive, solid porous insulation material such as a quilt or layer of rock wool or fiberglass, or sponge rubber.

U.S. Pat. No. 4,269,890 shows a foamed insulation device and method of introducing foam insulation into a cavity. A flexible bag of a preformed configuration is installed in the cavity to be insulated. The bag includes an open neck into which a foamable material is injected into the bag. The foamable insulation material then foams in situ filling the bag which bag expands to fill the cavity.

U.S. Pat. No. 4,282,279 shows an insulating enclosure which fits around a container to function as an insulating jacket. The insulating enclosure is fabricated of two pliable sheets of covering material fastened together at their peripheries. A layer of resilient insulating material is located between the sheets. The insulating material is a polyurethane foam material.

U.S. Pat. No. 4,403,023 shows an enclosure fabricated of a thermal insulation material. A mixture of powdered optical opacifiers and fibers of ceramic fill the enclosure.

There are a number of diverse problems associated with the prior-art insulation devices known to me.

Insulating material formed of bats or mats of insulation material must be cut to a particular peripheral configuration conforming to the shape of the apparatus to be insulated. On a production basis, this requires the use of special cutting dies. This process also generates scrap material during the cutting which scrap adds to the cost of the finished product.

A further problem with mats or bats of fibrous material, such as fiberglass, mineral fiber, ceramic fiber, and the like is that during handling of the mats fibers are released into the surrounding environment. These fibers can cause irritation and other health problems to those persons exposed to the fibers.

Another problem associated with insulation devices using mats or bats of insulation material is that their application is limited to the shape of the peripheral configuration of the bat which can be practically cut or otherwise formed in the bat. When the required form of an insulation device is complicated, the insulation device is typicallly made using plastic foams or high density molded fibrous insulation instead of bats or mats. However, plastic foams and molded fibrous insulation are relatively expensive as compared to bats or mats of insulation.

Another problem with bats or mats of fiberglass insulation is that the binder is released or off-gases.

A further problem with heretofore known insulation devices using a structure having a cavity or pocket filled with insulation is that the insulation will tend to shift or settle leaving voids within the cavity or pocket. The prior-art solution was to use bats or mats of insulation material in a bag-like structure and stitch the insulation to the bag walls. This is a time consuming process requiring many stitch lines. It also results in adversely effecting the insulation capabilities along the stitch lines, and causes holes to be made in the bag walls and insulation. Further, this attempted solution will not work with loose, discrete, divided insulation material. A solution to the foregoing concerns as provided by the present invention is to use an envelope whose shape is dictated by the configuration of the apparatus to be insulated. If the shape in the apparatus which is to be insulated is of a complex shape, then the shape of the matching envelope is complex in order to conform to the space. The configuration and thickness of the envelope is dictated by the configuration of the space which is to be insulated. In the past the requirement to insulate this type of complex configuration has required the use of a high-density molded plastic foam, molded so as to closely conform to the shape complexities in the space of the apparatus to be insulated. By fabricating an envelope which matches the shape of the space, the cost concerns existing with the prior approach are resolved. Filling the envelope with the loose, discrete insulation material so as to produce a sealed insulation device (insert) resolves much of the concern over fiber irritation and the addition of a binder addresses the concern of shifting insulation. In order to maintain the envelope shape through loose, discrete insulation material is used to completely fill the envelope and the insulation insert which results is then able to be inserted into the space to be insulated in a hollow wall structure (apparatus).

SUMMARY OF THE INVENTION

It is an object of the present invention to provide an insulation device of the type having an enclosure with a cavity filled with loose, discrete, divided insulation material which will not shift or settle.

It is another object of the present invention to provide for a method of fabricating an insulation device of the type having a cavity filled with loose, discrete, divided insulation material which does not require human contact with the insulation material to fill the cavity.

More particularly, the present invention provides an insulation device comprising an enclosure defining a cavity, and loose, discrete, divided insulation material filling the cavity and cohesively held together by a binder dispersed throughout the insulation material to prevent shifting or settling of the insulation material within the cavity.

The present invention also provides a method of making an insulation device comprising forming an opening into the cavity of an enclosure, injecting loose, discrete, divided insulation material through the opening of the enclosure into the enclosure cavity, concurrently with injecting the insulation material into the enclosure cavity spraying an uncured binder on the insulation material as it is being injected into the cavity to homogeneously distribute the binder throughout the insulation material being injected into the enclosure cavity, and closing the opening of the enclosure.

The present invention also provides a method of making an insulation device comprising mixing an uncured binder with a mass of loose, discrete, divided insulation material to homogeneously distribute the uncured binder throughout, forming an opening into the cavity of an enclosure, injecting the loose, discrete, divided insulation material through the opening of the enclosure into the enclosure cavity in order to support and maintain the peripheral configuration and contoured thickness of the enclosure, and sealing the opening of the enclosure.

BRIEF DESCRIPTION OF THE DRAWINGS

A better understanding of the advantages and features of the present invention will be had upon reference to the following description in junction with the accompanying drawings wherein like numerals refer to like parts through and in which:

FIG. 8 is a perspective view of another embodiment of an insulation device of the present invention shown to illustrate a diverse shape of an insulation device provided by the present invention; and, FIG. 9 is a schematic representation of an exemplary apparatus for filling the insulation device with insulation material.

DETAILED DESCRIPTION OF THE PREFERRED EMBODIMENTS

Figure 1:
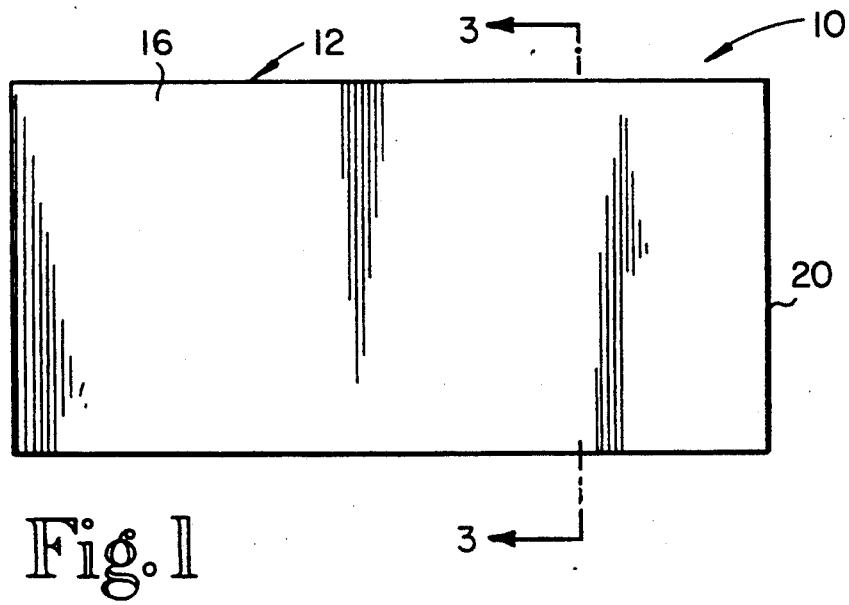
FIG. 1 is a perspective view of one embodiment of an insulation device of the present invention.
Figure 3:
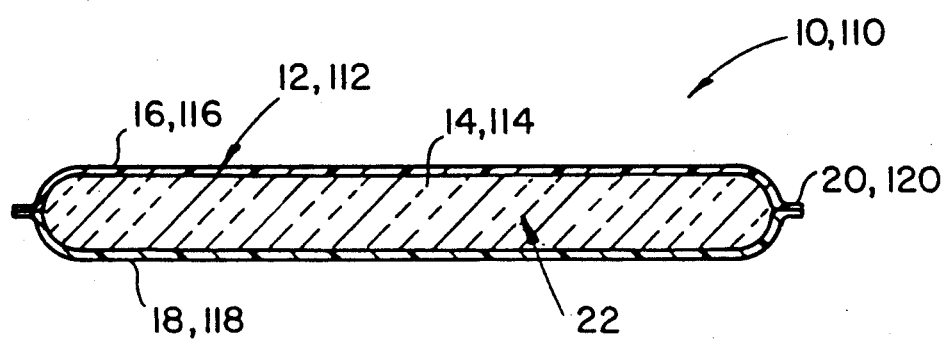
FIG. 3 is a cross-sectional view of the insulation device which is applicable to FIGS. 1 and 2.

With reference to FIGS. 1 and 3, there is shown an insulation device, generally denoted as the numeral 10, of the present invention. The insulation device 10 includes an enclosure 12 defining a cavity 14.

The enclosure 12 is fabricated of a fluid impermeable, pliable material such as, for example, polyethylene film, vinyl film, polyester film, metalized polyester, metal foil such as aluminum foil, and the like.

The material of the enclosure 12 is a function of the environment in which the insulation device 10 will be used.

The peripheral configuration and thickness of the enclosure 12 will be dictated by the configuration of the apparatus to be insulated.

The enclosure 12 can be fabricated, for example, of facing sheets 16 and 18 of pliable material sealed together at the peripheral edges of the facing sheets 16 and 18. One edge 20 of the facing sheets 16 and 18 can be left unsealed until after the enclosure 12 is filled with insulation material 22. The facing sheets 16 and 18 can be fabricated of the same material, for example, both sheets can be polyethylene sheets. Alternatively, the facing sheets 16 and 18 can each be fabricated of a different material from each other. For example, sheet 16 can be polyethylene and sheet 18 can be metal foil.

The insulation material 22 is binderless, loose, discrete, divided material having thermal and/or acoustical insulation or abatement properties. Some examples of suitable insulating materials are non-interengaged fiberglass, mineral wool, cellulose, ceramic fiber, beads of plastic foam, particles of lead and the like. The specific insulation material used will be a function of the end use and environment in which the insulation device is used. For example, in an accoustic insulation device additional accoustical properties can be obtained by adding mass to the walls of the enclosure 12 and/or adding mass to the insulation material 22. Toward this objective, the present invention provides for the application of a material having a relative high mass compared to the material of the enclosure 12 and insulation material 22 of the insulation device 10. The high mass material can be, for example, particles of sand or lead. The high mass material can be dispersed over the interior surfaces of the enclosure 12 and adhesively attached thereto, or dispersed throughout the insulation material 22.

A binder material is dispersed throughout the mass of insulation material 22 to cohesively hold the insulation material 22 together and prevent the insulating material 22 from shifting or settling within the cavity 14 of the enclosure 12. The binding material used will be a function of the type of insulation material 22 and the environment in which the insulation device is to be used. Also, the binder can be a thermosetting adhesive, thermoplastic adhesive a cold setting adhesive, a room or ambient setting adhesive, or a hot setting adhesive. For example, the following is a list of appropriate binders for use with various types of insulation material.

| INSULATION MATERIAL | BINDER |
| --- | --- |
| Fiberglass | Phenolic, Sodium Silicate |
| Mineral Wood | Phenolic, Sodium Silicate |
| Cellulose | Polyvinyl acetate |
| Sand Particles | Polyvinyl Acetate |

| INSULATION MATERIAL | BINDER |
|---|---|
| Lead Particles | Polyvinyl Acetate |

In a high temperature application, it has been determined that an enclosure 12 fabricated of a metal foil material and filled with discrete, divided fiberglass cohesively held together and adhesively attached to the wall surfaces of the enclosure 12 with a sodium silicate binder has remarkable success as a thermal insulating device.

Figure 2:
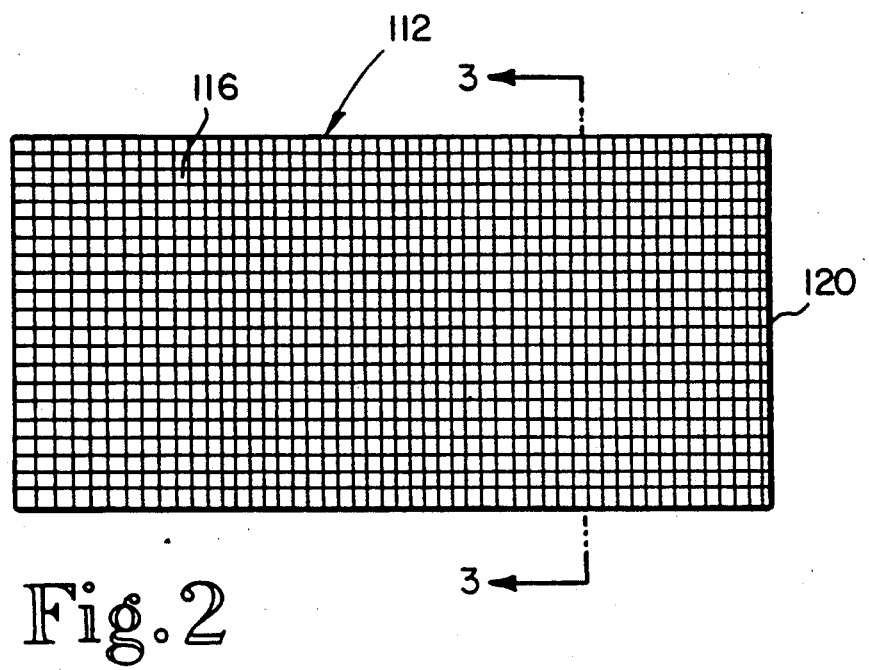
FIG. 2 is a perspective view of another embodiment of an insulation device of the present invention.

Now with reference to FIGS. 2 and 3, there is shown an insulation device, generally denoted as the numeral 110, which is similar to the insulating device 10.

The insulation device 110 includes an enclosure 112 defining a cavity 114.

The enclosure 112 is fabricated of a reticulated or open work material such as, for example, polyethylene film, vinyl film, polyester film, metalized polyester, metal foil, fiberglass scrim, thermoplastic netting and the like, which are pliable. It is also contemplated that the enclosure 112 can be fabricated of a reticulated or open work rigid material such as, for example, a plastic or metal. The material of the enclosure 112 is a function of the environment in which the insulation device 110 is to be used.

The peripheral configuration and thickness of the enclosure 112 will also be dictated by the configuration of the apparatus to be insulated.

The enclosure can be fabricated of facing sheets 116 and 118. One edge 120 of the facing reticulated sheets 116 and 118 can be left unsealed until after the enclousre 112 is filled with insulation material 22.

The insulation material 22 is the loose, discrete, divided material cohesively held together by a binder discussed above in regard to the insulation device 10.

The open work enclosure 112 exposes the insulation material 22 which may have an advantage in acoustical insulation applications, for example, wherein the material of a solid or continuous enclosure may detract from the acoustical absorbing properties of the insulation material 22. Further, the open work enclosure 112 would provide for air and/or moisture flow through the insulation device 110 to prevent condensation build-up in the enclosure and area in which the insulation device 110 is placed.

Figure 4:
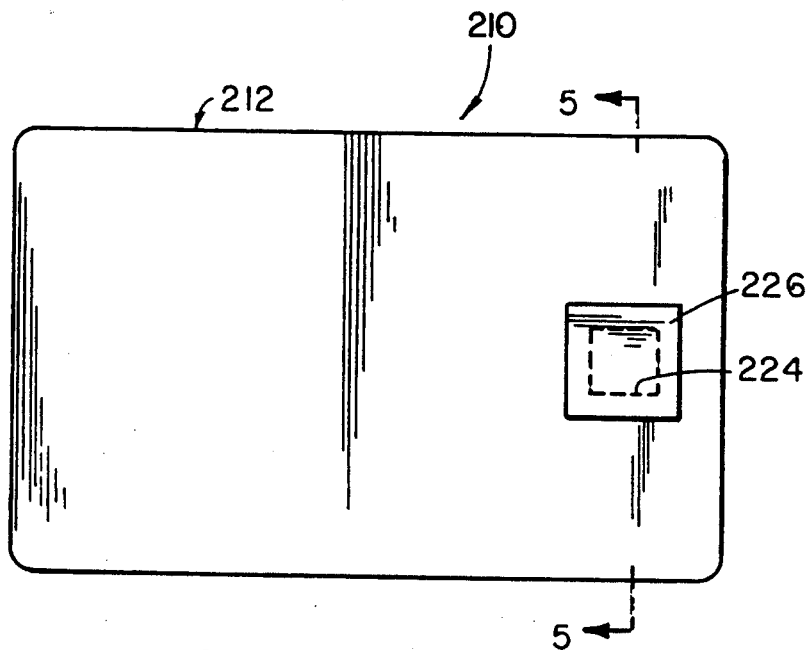
FIG. 4 is a perspective view of yet another embodiment of the insulation device of the present invention.
Figure 5:
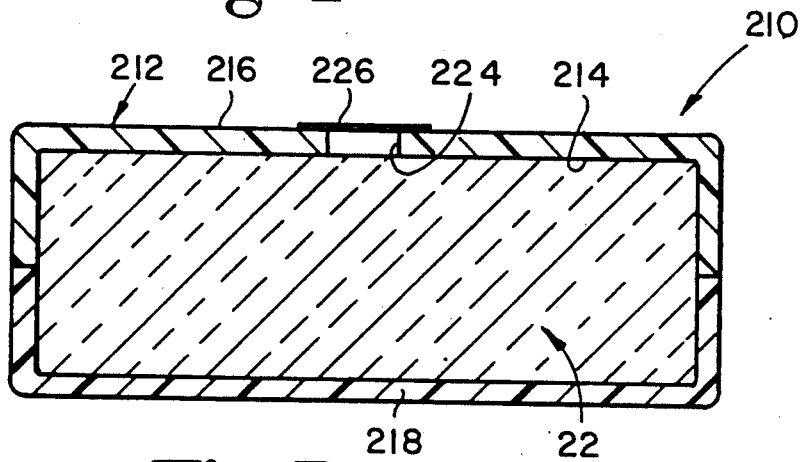
FIG. 5 is a cross-sectional view of the insulation device of FIG. 4.

FIGS. 4 and 5 show another embodiment of an insulation device, generally denoted as the numeral 210, of the present invention. The insulation device 210 includes an enclosure 212 defining a cavity 214.

The enclosure 212 is shown as being fabricated of a fluid impermeable, rigid material, for example, vacuum formed polystyrene, vacuum formed thermoplastics, molded polystyrene, molded urethane, and the like.

The enclosure 212 can be fabricated of, for example, concavely facing shells 216 and 218 in registration with each other and sealed together at the peripheral edges of the shells 216 and 218. One of the shells 216 can have an opening 224 for the purpose of filling the cavity 214 with insulation material 22. The opening 224 can be closed after the cavity 214 is filled, for example, with a tape 226.

As with the insulation device 10 and insulation device 110, the insulation material 22 filling the cavity 214 is loose, discrete, divided material cohesively held together by a binder as discussed above in regard to the insulation device 10.

Figure 6:
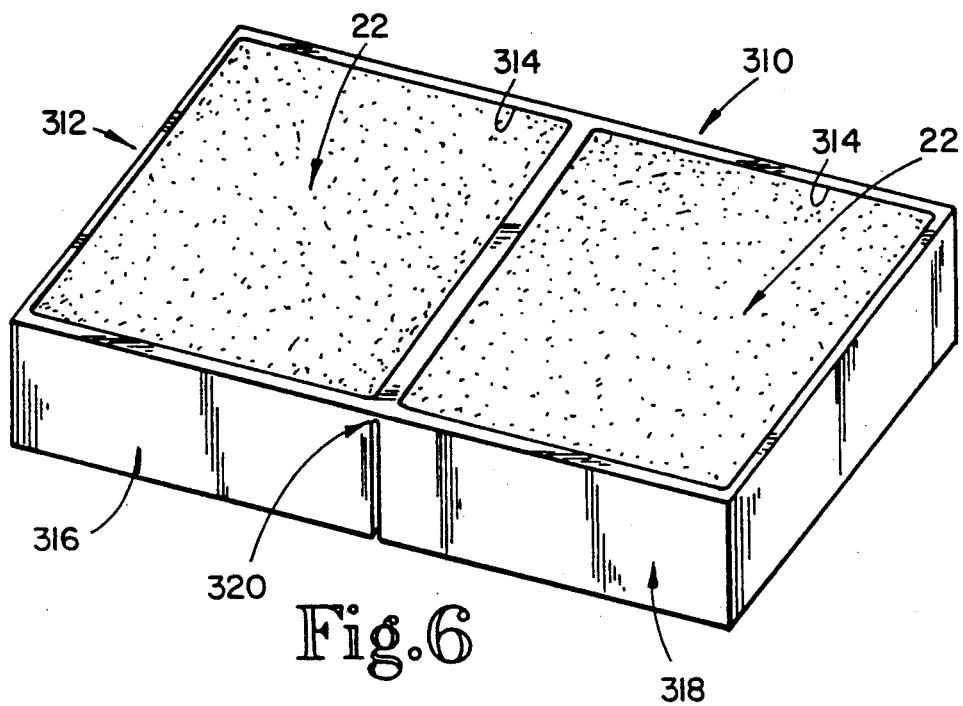
FIG. 6 is a perspective view of another embodiment of an insulation device of the present invention, wherein the enclosure is open during the process of filling the enclosure with insulation material.
Figure 7:
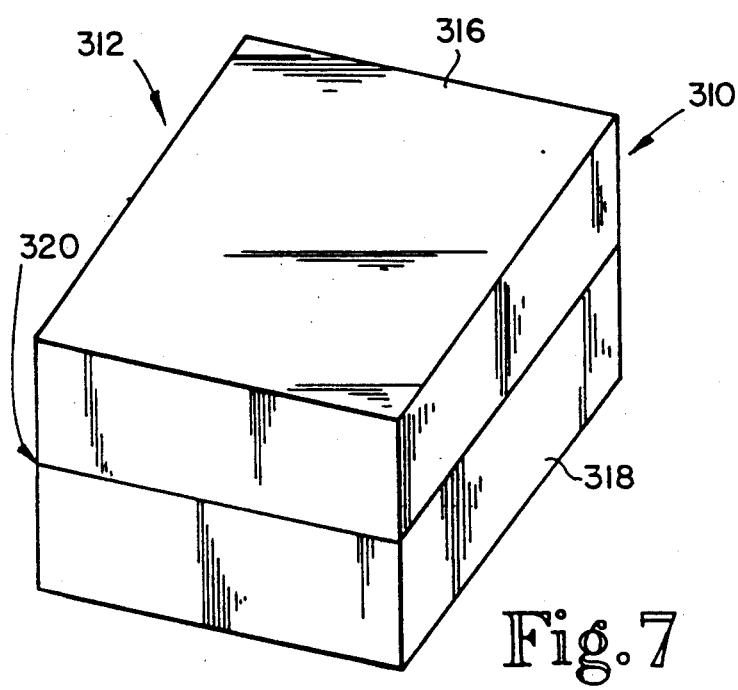
FIG. 7 is a perspective view of the insulation device of FIG. 6 filled with insulation material and with the enclosure closed.

Now with reference to FIGS. 6 and 7, there is shown another embodiment of an insulation device, generally denoted as the numeral 310, of the present invention similar to the insulation device 210. The insulation device 310 includes an enclosure 312 defining a cavity 314.

The enclosure 312 is shown as being fabricated of a fluid impermeable rigid material, for example, vacuum formed polystyrene, vacuum formed thermoplastics, molded polystyrene, molded urethane, and the like.

The enclosure 312 is fabricated of two concavely facing shells 316 and 318 hinged together at one of their adjacent peripheral edges by, for example, an integral or living hinge 320. The facing shells 316 and 318 are folded about the integral hinge 320 into registered concavely facing relationship after each shell 316 and 318 is filled with insulation material 22, and the peripheral edges of the shells 316 and 318 are sealed together forming the enclosure 312 shown in FIG. 7.

As with the insulation devices 10, 110 and 210, the insulation material filling the cavity 314 is loose, discrete, divided material cohesively held together by a binder as discussed above.

Referring to FIG. 8, there is shown a further embodiment of an insulation device, generally denoted as the numeral 410, of the present invention illustrating a diverse shape provided by the present invention.

The insulation device 410 includes an enclosure 412 in the shape of a cylinder having a cavity 414.

The enclosure 412 is fabricated of two coaxial, spaced apart cylinders 416 and 418. The cylinders 416 and 418 can be fabricated of material such as polyethylene film, vinyl film, polyester film, metalized polyester, metal foil rigid polyvinyl chloride, molded vinyl, expanded metal, and the like. Fuirthermore, the outer cylinder 416 and inner cylinder 418 can be fabricated of different materials from each other. For example, the outer cylinder 416 can be fabricated of rigid PVC and the inner cylinder 418 of vinyl film. The cavity 414 is defined between the inner wall surface of the cylinder 416 and outer wall surface of the cylinder 418. The bottom end 420 of the cavity 414 can be closed by a toroidally-shaped plug before the cavity is filled with insulation material 22 to prevent the insulation material 22 from running out of the cavity 414 before the binder is cured.

In all of the above discussed embodiments, the insulation material 22 is adhesively bonded to the wall surfaces of the enclosures 12, 112, 212, 312 and 412 by the same binder of the insulation material 22.

Figure 9:
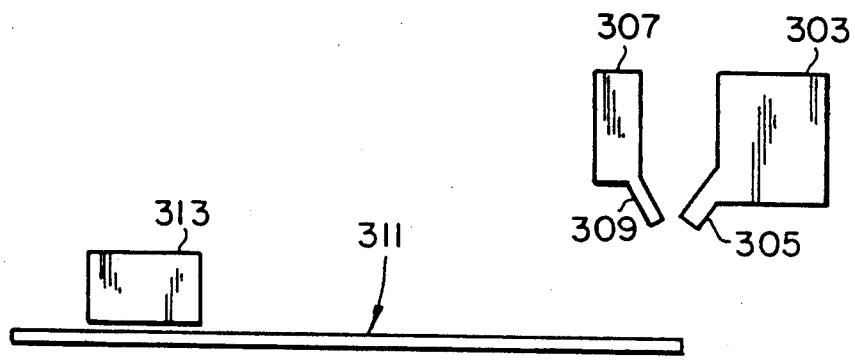

With reference to FIG. 9, there is shown, in schematic form, an example of an apparatus, generally denoted as the numeral 301, for filling the cavity 14 of enclosure 12, cavity 114 of enclosure 112, cavity 214 of enclosure 212 the cavity 314 of enclosure 312 and the cavity 414 of enclosure 412 with insulation material 22.

The apparatus 301 includes a source of insulating material 22 such as a reservoir 303. A filling nozzle 305 is in communication with the reservoir 303 for directing insulating material 22 into the enclosure cavity 14, 114, 214, 314, 414 through the opening of the enclosure 12, 112, 212, 312, 412 into the enclosure cavity 14, 114, 214, 314, 414. The apparatus 301 further includes a source of uncured binder such as a reservoir 307 with an uncured binder application nozzle 309 in communication with the uncured binder reservoir 307 for directing uncured binder onto the insulation material 22 as the insulation material 22 exists the insulation fill nozzle 305 and before the insulation enters the enclosure cavity 14, 114, 214 314, and 414. Thus, the insulation material 22 is coated with an uncured binder so that the uncured binder is homogeneously distributed throughout the insulation material 22.

In one embodiment, after the enclosure cavity 14, 114, 214, 314, 414 is filled with insulation material 22, the uncured binder is cured, and then the cavity opening is closed and sealed.

In another embodiment, after the enclosure cavity 14, 114, 214, 314, 414 is filled with insulation material 22, the cavity opening is closed and sealed, and then the uncured binder is cured.

In operation, after the enclosure cavity 14, 114, 214, 314, 414 is filled with insulation material 22 and uniformly dispersed uncured binder, it is contemplated that the insulating device 10, 110, 210, 310, 410 can be vibrated or otherwise shaken, for example, on a vibrating conveyor device 311 to evenly distribute the insulation material 22 throughout the enclosure cavity 14, 114, 214, 314, 414 before the binder is cured or sets.

If a heat-activated binder is used, the enclosure 12, 112, 212, 312, 412 is heated to an appropriate temperature to activate the binder. Toward this objective, a furnace 313 can be located along the vibrating conveyor 311 to heat the enclosure 12, 112, 212, 312, 412.

With continued reference to FIG. 9, it is also contemplated that the reservoir 307 for the uncured binder and the uncured binder application nozzle 309 can be eliminated. In this situation, the binder is thoroughly mixed with the insulation material 22 in the insulation source reservoir 303.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A method of making a preformed insulation module which is fabricated separately prior to installation into the apparatus to be insulated, said method comprising the steps of:
    fabricating an enclosure which defines an interior cavity out of a fluid impermeable, pliable material with a peripheral configuration and contoured thickness dictated by the configuration of the apparatus to be insulated;
    forming an opening into the cavity of the enclosure;
    injecting loose, discrete divided insulation material through the opening of the enclosure into the cavity of the enclosure so as to fill said cavity in order to support and maintain the peripheral configuration and contoured thickness of said enclosure;
    concurrently with injecting the insulation material into the cavity, applying an uncured binder on the insulation material as it is being injected into the cavity to homogeneously distribute the uncured binder throughout the insulation material being injected into the enclosure cavity; and,
    closing the opening of the enclosure.

2. The method of claim 1, further comprising the steps of, after the opening of the enclosure is closed, curing the binder.

3. The method of claim 1, further comprising the step of curing the binder prior to closing the opening into the enclosure cavity.

4. The method of claim 1, further comprising the step of:
    shaking the filled enclosure prior to closing the opening into the enclosure to evenly distribute the insulation material throughout the enclosure cavity;
    curing the binder; and
    then closing the opening into the enclosure cavity.

5. The method of claim 1 further comprising the steps of:
    shaking the filled enclosure prior to closing the opening into the enclosure to evenly distribute the insulation material throughout the enclosure cavity;
    closing the opening into the enclosure cavity; and,
    curing the binder.

6. The method of claim 1, wherein:
    the binder is a heat activated adhesive; and,
    after the opening of the enclosure is closed, evenly distributing the insulating material through the enclosure cavity; and,
    after the insulation material has been evenly distributed throughout the enclosure cavity, heating the enclosure to a sufficient temperature to activate the heat activated adhesive.

7. A method of making an insulation module which is fabricated separately prior to installation into the apparatus to be insulated, said method comprising the steps of:
    forming a mass of loose, discrete divided insulation material and an uncured binder homogeneously distributed throughout the mass of insulation material;
    forming an enclosure which defines an interior cavity out of a fluid impermeable pliable material with a pierpheral configuration and contoured thickness dictated by the configuration of the apparatus to be insulated;
    forming an opening into the cavity of the enclosure;
    injecting the loose, discrete, divided insulation material through the opening of the enclosure into the enclosure cavity so as to fill said cavity in order to support and maintain the peripheral configuration and contoured thickness of said enclosure; and
    closing the opening of the enclosure.

8. The method of claim 7 further comprising the step of curing the binder prior to closing the opening of the enclosure.

9. The method of claim 7, further comprising the steps of curing the binder after the opening of the enclosure is closed.

10. The method of claim 7, further comprising the steps of:
    shaking the filled enclosure prior to closing the opening into the enclosure to evenly distribute the insulation material throughout the enclosure cavity;
    curing the binder; and,
    then closing the opening into the enclosure cavity.

11. The method of claim 7, further comprising the steps of:
    shaking the filled enclosure prior to closing the opening into the enclosure to evenly distribute insulation material throughout the enclosure cavity;
    curing the binder.

12. The method of claim 7, wherein
    the binder is a heat activated adhesive; and
    heating the enclosure to a sufficient temperature to cure the adhesive.

13. A method of making a preformed insulation module which is fabricated separately prior to installation into the apparatus to be insulated, said method comprising:
fabricating an enclosure which defines an interior cavity out of a fluid impermeable, pliable material with a peripheral configuration and contoured thickness dictated by the configuration of the apparatus to be insulated;
forming an opening into the cavity of said enclosure;
injecting loose, discrete, divided insulation material through the opening of the enclosure into the cavity of the enclosure so as to fill said cavity in order to support and maintain the peripheral configuration and contoured thickness of said enclosure;
concurrently with injecting the insulation material into the cavity, applying an uncured binder on the insulation material as it is being injected into the cavity to homogeneously distribute the uncured binder throughout the insulation material being injected into the enclosure cavity; and
curing the uncured binder.

14. A method of making an insulation module which is fabricated separately prior to installation into the apparatus to be insulated, said method comprising:
forming an enclosure which defeinds an interior cavity out of a fluid impermeable, pliable material with a peripheral configuration and contoured thickness dictated by the configuration of the apparatus to be insulated;
forming a mass of loose, discrete, divided insulation and an uncured binder homogeneously distributed throughout the mass of insulation material;
injecting the loose, discrete, divided insulation material through the opening of the enclosure into the enclosure cavity so as to fill said cavity in order to support and maintain the peripheral configuration and contoured thickness of said enclosure; and,
curing the uncured binder.

15. A method of making a preformed insulation module which is fabricated separately prior to installation into the apparatus to be insulated, said method comprising the steps of:
fabricating an enclosure which defines an interior cavity out of a fluid impermeable, pliable material with a peripheral configuration and contoured thickness dictated by the configuration of the apparatus to be insulated;
forming an opening into the cavity of the enclosure;
injecting loose, discrete, divided insulation material through the opening of the enclosure into the cavity of the enclosure so as to fill said cavity in order to support and maintain the peripheral configuration and contoured thickness of said enclosure; and,
closing the opening of the enclosure.

16. A method of making a preformed insulation module which is fabricated separately prior to installation into the apparatus to be insulated, said method comprising the steps of:
fabricating an enclosure which defines an interior cavity out of a fluid impermeable, pliable material with a peripheral configuration and contoured thickness dictated by the configuration of the apparatus to be insulated;
forming an opening into the cavity of the enclosure;
providing loose, discrete, divided insulation material;
adding mass to said divided insulation material by dispersing high-mass material throughout the insulation material;
injecting said insulation material with said dispersed high-mass material through the opening of the enclosure into the cavity of the enclosure so as to fill said cavity in order to support and maintain the peripheral configuration and contoured thickness of said enclosure;
concurrently with injecting the insulation material with the high-mass material dispersed therethrough into the cavity, applying an uncured binder on the insulation material with the high-mass material dispersed therethrough as it is being injected into the cavity to homogeneously distribute the uncured binder throughout the material being injected into the enclosure cavity; and,
closing the opening of the enclosure.

17. A method of making a preformed insulation module which is fabricated separately prior to installation into the apparatus to be insulated, said method comprising the steps of:
fabricating an enclosure which defines an interior cavity out of a fluid impermeable said enclosure having an interior surface, pliable material with a peripheral configuration and contoured thickness dictated by the configuration of the apparatus to be insulated;
forming an opening into the cavity of the enclosure;
dispensing over and adhesively attaching to the interior surface of said enclosure a high-mass material;
injecting loose, discrete divided insulation material through the opening of the enclosure into the cavity of the enclosure so as to fill said cavity in order to support and maintain the peripheral configuration and contoured thickness of said enclosure;
concurrently with injecting the insulation material into the cavity, applying an uncured binder on the insulation material as it is being injected into the cavity to homogeneously distribute the uncured binder throughout the insulation material being injected into the enclosure cavity; and,
closing the opening of the enclosure.

* * * * *